United States Patent [19]

Buckley

[11] 4,150,659
[45] Apr. 24, 1979

[54] APPARATUS FOR PREVENTING HIGH TEMPERATURES IN A GLAZED SOLAR COLLECTOR

[76] Inventor: Bruce S. Buckley, 410 Memorial Dr., #154, Cambridge, Mass. 02139

[21] Appl. No.: 783,763

[22] Filed: Apr. 1, 1977

[51] Int. Cl.² ............................................... F24J 3/02
[52] U.S. Cl. ...................................... 126/270; 126/27
[58] Field of Search ............... 126/270, 271; 237/1 A; 165/48, 81, 82, 83, 49, 18; 52/171, 304

[56] References Cited

U.S. PATENT DOCUMENTS

| | | | |
|---|---|---|---|
| 3,273,558 | 9/1966 | Boothe | 126/271 |
| 3,943,911 | 3/1976 | Yu | 126/270 |
| 3,949,732 | 4/1976 | Reines | 126/270 |
| 4,043,317 | 8/1977 | Scharfman | 126/270 |

*Primary Examiner*—Carroll B. Dority, Jr.
*Assistant Examiner*—Larry Jones

[57] ABSTRACT

Venting the glazing (i.e., transparent cover) of a solar collector can be used to prevent the collector's absorber surface from reaching too high a temperature.

4 Claims, 6 Drawing Figures

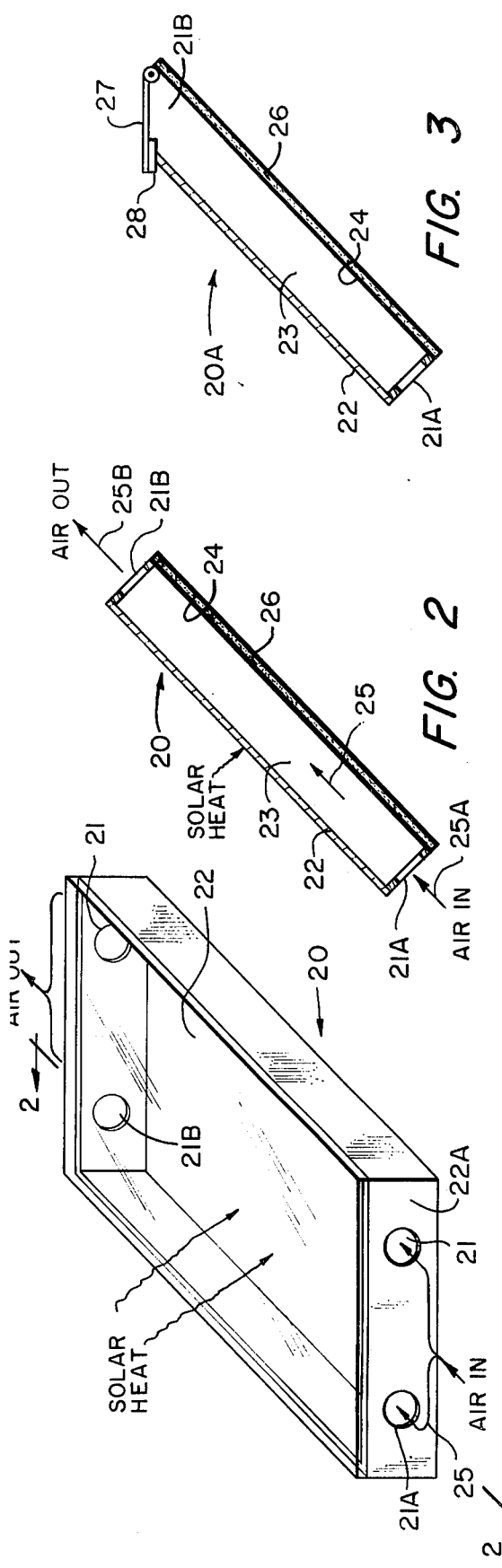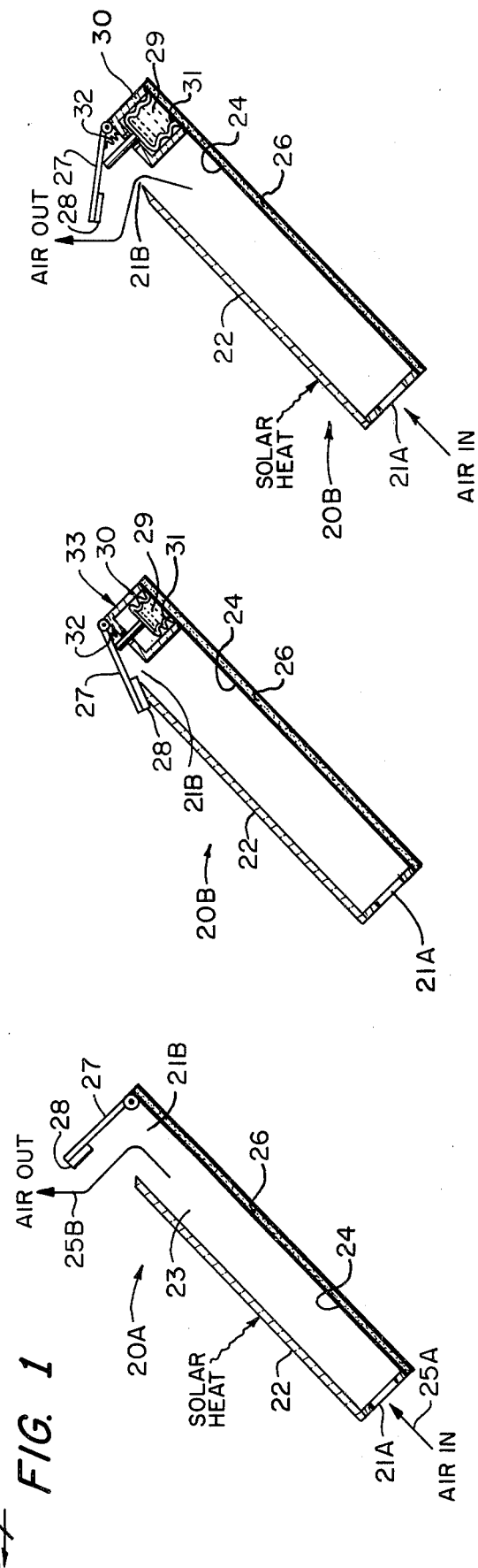

APPARATUS FOR PREVENTING HIGH TEMPERATURES IN A GLAZED SOLAR COLLECTOR

The present invention relates to solar collectors and the like.

Since solar collectors can be more cheaply built if they are not pressurized and can be installed cheaper if they use water (with its low boiling point) as a heat transfer liquid, a cheap solar energy system must have a method for preventing the contained liquid from boiling under certain conditions. These conditions often occur when a pump failure or power failure prevent the liquid from circulating through the collector: without this coolant flow the collector temperature can easily go above the boiling point of the liquid. Even in passive systems (which don't rely on pumps for heat transfer), conditions which would cause boiling could occur.

Solar panels which can "over-temperature" (i.e., boil the contained water) usually have glazing: a transparent cover over the collector's heat absorbing surface which both allows solar heat to enter and reduces heat loss from this surface.

Accordingly, an object of the present invention is to provide a novel means for cooling this absorbing surface by using forced or natural convection of air between the glazing and absorbing surface.

Another object is selectively permitting this cooling flow by blocking the air flow between the glazing and the absorbing surface.

A further object is to provide automatic means for selectively blocking the air flow in response to the temperature of the absorbing surface.

These and still further objects are discussed hereinafter and are particularly pointed out in the appended claims.

The foregoing objects are achieved by providing venting means at at least two points in the glazing, providing damping means to selectively block the free or forced convection of air between the glazing and absorbing surface through said venting means and by automatically controlling said damping means in response to a temperature parameter of the system.

The invention hereinafter described with reference to the accompanying drawing which:

FIG. 1 is an isometric view of a solar collector showing vented glazing of the present invention;

FIG. 2 is a section view taken upon the line 2—2 in FIG. 1, slightly reduced in size and tilted at a 45° angle;

FIG. 3 is a section view of a solar collector similar to section 2—2 of FIG. 1, including a closed damper means of the present invention;

FIG. 4 is a section view of a solar collector as in FIG. 3 but with the damper means opened to allow air flow;

FIG. 5 is a section view of the top of a solar collector as in FIG. 3 but with automatic damper means; and FIG. 6 is a section view of the top of a solar collector as in FIG. 5 but with automatic damper means opened to allow air flow.

THE INVENTION

Turning now to FIG. 1, there is shown a glazed solar collector 20 which, as shown in FIG. 2, contains a liquid 26 that, in the absence of counter measures, can be brought to a boil during some conditions of operation, as above indicated. In FIGS. 1 and 2 the glazing, which is labeled 22, is supported at its perimeter by a box 22A, but the glazing 22 and the box 22A can be a single formed transparent or translucent plastic. In the present system, boiling is prevented by venting the glazing 22. Venting is accomplished by openings or holes 21 in the glazing 22 (or its perimeter 22A) at its top and bottom (the left bottom and the top holes in FIG. 1 are labeled 21A and 21B, respectively, to facilitate the explanation later with reference to FIG. 2) and providing an air passage (or passages) 23 between these openings 21 (i.e., between the opening 21A and the opening 21B in FIG. 2) and adjacent to the absorbing surface shown at 24 in FIG. 2.

For free convection, the air entering the tilted collector 20 in FIG. 2 at the bottom hole or holes 21A is heated by convection by the absorber surface 24. The reduced density causes buoyancy forces which induces the air to rise through the top hole or holes 21B. This is called the "chimney effect" since the same principle causes a fire's smoke to rise up a chimney. As the air flows out the top as indicated by the arrow 25B, it takes heat with it, cooling the absorber surface; air movement into the space 24 is indicated by the arrow labeled 25A. With proper design the cooling effect can prevent the absorber surface 24 from reaching the boiling point of the enclosed liquid 26.

More often, in practice, the "chimney effect" is not the dominant mode of heat transfer from the absorber surface 24. Depending where on a roof or wall the collectors 20 are located, the ambient wind can induce air flow, as indicated by the arrow marked 25 in FIG. 2, between the glazing and absorber if the wind causes static pressure differences between the top and bottom holes 21A and 21B, respectively. This forced convection in some designs can remove substantially more heat than can the free convection described above. Note that free convection works best on a vertical or inclined collector whereas forced-convection dpends more on the local wind direction and intensity.

Although venting the glazing can assure the absorber 24 can be cooled to below the boiling point of its contained liquid 26, it might not always be advantageous to do so. For example, during the winter there would be little chance that the contained liquid 26 would boil even without the vents 21. Furthermore the vents 21 would allow excessive heat loss making the collectors inefficient in summer. Thus this invention provides not only a means for cooling the absorber by venting but also a means of selectively opening or closing the holes either manually or automatically.

In the simplest case, the holes 21 could be closed by taping them over or plugging them when it was useful to do so, e.g. in the winter. Ofter only the top holes 21B of the tilted collector 20 need be covered since the heated air would tend to collect inside the collector even if the bottom holes 21A were left uncovered.

Another way is to install suitable dampers 27 on the top holes 21B as in FIGS. 3 and 4 wherein the solar collector is marked 20A; the dampers 27 would be manually closed in winter (FIG. 3) for efficient solar collection and opened in summer (FIG. 4) to prevent over-temperature of the contained liquid 26.

A flexible seal 28 on the damper's edge insures little air leakage out the top vent 21B when the damper 27 is closed.

Rather than manually adjusting the position of the dampers 27, they can be made to operate automatically as in FIGS. 5 and 6 wherein the solar collector is labeled 20B. The collector 20B includes valving means 33 that comprises metal bellows 29 bonded to the absorber surface 24 and insulated from solar radiation by insulation 30; the bellows 29 thus will have a temperature very nearly equal to that of the absorber's contained liquid 26. If the bellows 29 contains a second liquid, 31, like alcohol, which vaporizes at a temperature somewhat less than that of the absorber's liquid 26, the bellows 29 will expand at a temperature below the boiling point of the liquid 26 contained in the absorber 24. Using the bellow's expansion to open the damper 27 will insure that the cooling effect of the vented glazing will only occur if the absorber liquid 26 is close to its boiling point. Springs 32 can be used to keep the damper 27 closed unless the absorber liquid 26 is near boiling.

Since many solar collectors 20 have their hottest absorber liquid 26, at the top of the absorber plate 24, the bellows 29 should also be at the top so it will sense the hottest possible absorber liquid temperature. In the figure shown this was the case: a compact mechanism 33 resulted since the bellows 29 was in close proximity to the flowmodulating damper 27. In other designs where the collector outlet temperature (the hottest absorber liquid) is not near the damper 27, the bellows 29 can be linked to the damper 27 via pneumatic, hydraulic or linkage means. In any case, when the highest absorber liquid is near boiling, the damper 27 should open allowing the glazing vents 21B to cool the absorber.

Also it should be noted that other valving means 33 besides a liquid-filled bellows are possible. For example the damper 27 could be opened by the action of a a wax-filled bulb expanding a bellows similar to bellows 29 or a wax-driven piston as in a common automotive thermostat could be used to open the damper 27 at the proper temperature.

While particular embodiments of the invention are described hereinbefore, it will be apparent that various modifications can be made in the form and construction thereof without departing from the fundamental principles of the invention. It is, therefore, desired by the following claims to include within the scope of the present invention all similar and modified forms of the apparatus disclosed and by which the results of the invention can be obtained.

What is claimed is:

1. Solar energy collecting apparatus, comprising
   a solar energy absorber providing an absorbing surface,
   glazing means spaced from said surface by an air space,
   framing means supporting said absorber and said glazing means in their said spaced relation and including at least one wall transverse to said surface at a first end of said apparatus, said wall having a vent through which said air space can communicate with the exterior of said apparatus at said first end,
   a damper at a second end of said apparatus opposite said wall, said damper being movable between a first position allowing communication between said air space and the exterior of said apparatus at said second end and a second position sealed against said glazing to prevent said communication at said second end,
   means for undergoing thermally produced dimensional change in direct response to changing temperature conditions at said apparatus to move said damper between said positions to allow air flow through said apparatus between said ends when said temperature exceeds a limit.

2. The apparatus of claim 1 wherein said damper is hinged and is oblique to said glazing means in said second position.

3. The apparatus of claim 1 wherein said last mentioned means comprises an expandable fluid chamber.

4. The apparatus of claim 3 wherein said chamber is a bellows.

* * * * *

UNITED STATES PATENT AND TRADEMARK OFFICE
CERTIFICATE OF CORRECTION

PATENT NO. : 4,150,659
DATED : April 24, 1979
INVENTOR(S) : BRUCE S. BUCKLEY

It is certified that error appears in the above-identified patent and that said Letters Patent are hereby corrected as shown below:

COLUMN 1, after title of the invention, add:

--GOVERNMENT RIGHTS

The Government of the United States of America has rights in this invention under an agreement that is based on National Science Foundation Grant No. GI-43897 to the Massachusetts Institute of Technology.--

Signed and Sealed this

Seventeenth Day of June 1980

[SEAL]

Attest:

Attesting Officer

SIDNEY A. DIAMOND

Commissioner of Patents and Trademarks